Patented Jan. 10, 1950

2,493,866

UNITED STATES PATENT OFFICE 2,493,866

RECOVERY OF ABIETIC ACID

Frederick H. Gayer, Chicago, Ill., assignor to Continental Research Corp., Chicago Heights, Ill., a corporation of Illinois No Drawing. Application May 3, 1947, Serial No. 745,721

23 Claims. (Cl. 260—97.5)

This invention relates to a process for recovering resin acids of the abietic acid type in crystalline form.

In one specific embodiment the present invention relates to a process for separating resin acids of the abietic type from resin acid mixtures of sizable abietic acid content and originating from various species of coniferous trees, such as rosin, tall oil resin acids, and the like starting materials as hereinafter more fully described.

It is well known that rosin contains two main types of resin acids:

(1) Primary resin acids which include "sapinic acids," l-pimaric and d-pimaric acids.

(2) Abietic acids, the most important individual member of which is l-abietic acid.

The primary acids are the acids produced by the living tree. With the exception of d-pimaric acid they are highly unstable compounds and are isomerized into abietic acids by heating to relatively moderate temperatures, by catalytic agents such as mineral acids, glacial acetic acid or by ultraviolet light. The isomerization apparently proceeds by stages, each stage corresponding to individual acids intermediate between the unstable primary acids and the relatively stable final product of isomerization, viz. l-abietic acid. The isomerized acids are isomorphous and by fractional crystallization only a partial resolution of their mixtures can be effected. It is for this reason that in the technical literature the isomerized acids are usually referred to simply as "abietic acid" which is to be understood as a generic term rather than one implying a chemical individual. It is in this sense that the term will be used herein. A stricter characterization of what constitutes abietic acid according to the present disclosure is found in the ability of l-abietic acid and some of the intermediate acids to form an acid alkali metal salt of the composition $3C_{19}H_{29}COOH \cdot C_{19}H_{29}COONa$, the so-called quarter salt, while the primary acids lack this ability. The quarter salt has a strong tendency to crystallize from organic solvent solutions and has therefore been used for the isolation of abietic acid from other rosin components. The term abietic acid as used herein is therefore further defined as denoting those components of rosin which are capable of crystallizing in the form of the quarter salt.

According to the isomerizing influences to which rosin is subjected before and during its processing, the abietic acid content of different samples of rosin is subject to wide variations. Generally speaking, gum rosin contains less abietic acid than wood rosin. Rosin treated either by heating or by chemical means to increase the proportion of abietic acid is known as "isomerized rosin," one form of which is "Commercial Abietic Acid." A highly isomerized rosin is available in the resin acid fraction of tall oil, the abietic acid content of which is well over 50%.

A common characteristic of the resin acid mixtures enumerated above is that if they are relatively free of oxidized rosin they will undergo crystallization if kept for prolonged periods at temperatures ranging from approximately 65° to 150° C. The tendency to crystallization sharply increases with the abietic acid content of the resin acid mixture and is incomparably stronger with tall oil resin acids than with gum or wood rosin.

An object of the present invention is the separation of abietic acid, as hereinbefore defined, and characterized by its ability to form a quarter salt from the other types of resin acids which do not form a quarter salt and will be simply termed "non-abietic acids" or "non-abietic type resin acids."

In contrast to the starting materials and to the separated abietic acid fraction, the non-abietic acid portion is characterized by the absence of crystallizability when kept for prolonged periods at higher temperatures. The non-abietic acid fraction, therefore, constitutes non-crystallizing rosin which is highly useful in the arts wherever crystallization during the heating of rosin is disadvantageous, and the separation and recovery thereof is another object of my invention.

While rosin owes much of its traditional usefulness to the properties resulting from its complex composition, a successful method for separating its components as to chemical type may be of great value for future developments. Each type of resin acid can be assumed to be more useful for special purposes than its mixtures with other types. Besides having increased usefulness in some of the known commercial application, such separated resin acids may find use as starting materials for synthetic products. Despite the obvious advantages involved, however, prior art relating to the separating, on a commercial scale, of resin acids of one type from those of another is practically non-existent. In known instances of the prior art of obtaining abietic acid, organic solvents are used as crystallizing media which makes such methods commercially unattractive.

According to the present invention, and in distinction from the prior art, abietic acid is obtained by using water as the crystallizing medium.

A necessary condition for the formation of a crystalline product is a minute subdivision and uniform distribution, briefly, a dispersion of resin acids in water as the dispersion medium. I have found that in aqueous dispersions of suitable resin acid mixtures in which the resin acids may or may not be partially neutralized with an alkali metal base, on standing, especially at somewhat elevated temperatures, abietic acid will crystallize, and that under favorable conditions it is possible to precipitate substantially all of the abietic acid present in the crystalline form, while the non-abietic type resin acids remain in the dispersion. By separating the crystals from the aqueous phase, as by filtration, abietic acid of high purity is obtained, the filtrate containing all of the non-abietic type resin acids originally present in the starting material.

The following examples are introduced to illustrate important features of the present invention.

*Example 1*

N wood rosin was isomerized according to the procedure of Palkin and Harris (J. A. C. S. 56, 1935 (1934)). The resulting isomerized rosin had an acid number of 165.

Ten grams of the isomerized rosin were heated under reflux for one hour with 8.3 cc. 2.12 N sodium hydroxide whereby 60% of the resin acids were neutralized. The mixture was now stirred into 250 cc. boiling water to form a dispersion and while stirring was continued, 5.9 cc. 2 N sulphuric acid were added which caused decomposition of two-thirds of the soap previously formed. The milky dispersion which now contained 80% of the resin acids as dispersed, free resin acids and 20% as soap, was allowed to stand several hours at a temperature of about 80° C. The crystals formed were separated from the aqueous phase by filtration.

*Crystalline product:*—5.4 grams abietic acid which has an acid number 180 and can be transformed into the quarter salt.

*Example 2*

Ten grams of a tall oil resin acid fraction which contained 10% fatty acids and had an acid number of 170, were treated under reflux with 9.2 cc. 2.12 N sodium hydroxide which neutralized the fatty acids and 60% of the resin acids present. The mixture was dispersed in 300 cc. water of 95° C. To the dispersion, presently, 8.0 cc. 2 N sulphuric acid were added in order to completely decompose the resin acid soap previously formed and thereby obtaining a fine dispersion of free resin acids in water, the fatty acid soap serving as dispersing agent. On standing several hours at a temperature of 70–80° C. abietic acid crystallized. Filtration and washing of the crystals gave as crystalline product 6.0 grams abietic acid, acid number 181. The milky filtrate containing the non-abietic type acids in the dispersed state, remained a stable dispersion after standing at room temperature for several weeks.

*Example 3*

The filtrate from Example 1 was acidified and boiled in order to recover the non-abietic acids and the major portion of the neutral matter which, through the crystallization of the abietic acid, had been concentrated in the filtrate. The recovered mixture was a soft solid at room temperature. In order to remove the neutral bodies the mixture was neutralized with 2.04 N sodium hydroxide and the neutral matter extracted with benzol. Decomposition of the extracted soap gave hard resin acids, acid number 172 and a melting point higher than that of the isomerized rosin. These resin acids are non-crystallizing when kept at elevated temperatures and do not form a quarter salt.

These examples strikingly illustrate the simplicity and economy of the present process in obtaining abietic acid of high purity, as compared to the methods of the previous art which were based on the use of organic solvents. It is easily seen, however, that, as to results, crystallization from aqueous dispersion is fully equivalent to crystallization from organic solvent solutions, i. e. abietic acid crystallizes from a medium which itself retains the non-abietic type resin acids and the neutral bodies. Indeed, crystallization from dispersion according to the present invention may be looked upon as a partial, irreversible and oriented flocculation which affects only the abietic acid portion of the dispersed phase. In other words, the dispersions underlying the present process are highly unstable as regards the abietic acid portion but stable as to the non-abietic acid portion of the dispersed phase. This difference in stability makes a clean separation of the two types of resin acids possible.

The most important characteristic of dispersions suitable for the purposes of the present invention is the proportion of free resin acids to total resin acids present in the dispersion. The dispersions in the foregoing Examples 1 and 2 which are typical of the present process contain by far the greater portion or all of the resin acids in the free state. In Example 1 abietic acid crystallized from a dispersion in which 80% of the resin acids were present in the free state, 20% as soap. In Example 2 all of the resin acid soap has been decomposed, the fatty acid soap remaining undecomposed. Since neither resin acid soap nor fatty acid soap enter into reaction with the dispersed free resin acids, the sole function of the soaps appears to be that of dispersing agents the presence of which makes the preparation of the dispersion by moderate stirring possible. As to the ratio of free resin acids to resin acid soap, the present disclosure is limited to ratios higher than about 3:1. In distinction, my copending application, Serial No. 745,723, describes a method for obtaining the crystalline quarter salt of abietic acid from dispersions in which the above ratio is 3:1 or less. The boundary between the crystallization of abietic acid and of quarter salt is not a sharp one and there may exist a narrow range of free resin acid: resin acid soap ratios in which both abietic acid and the quarter salt crystallize. It also will be realized that with different starting materials the dividing ratio may vary somewhat and allowance must also be made for such factors as the proportion of water to solids in the dispersions, the nature and concentration of the salt present, the cation of the soap, the presence of added dispersing agents, details of manipulation, etc. In the border region between quarter salt and abietic acid crystals, the type of crystal is especially sensitive to the effect of hydrolysis of the dissolved alkali abietate. Thus, factors favoring hydrolysis such as low soap concentration (high water ratio) favor the formation of abietic acid crystals, whereas influences which repress hydrolysis, such as presence of salt, shift crystallization toward the quarter salt side.

The proportion of free resin acids in a crystallizing dispersion is most conveniently expressed as the percentage proportion of free resin acids related to the total of free and neutralized resin acids present and will be termed herein "free resin acid ratio," abbreviated: FRA. Expressed in this form, dispersions in accordance with the present invention are of a free resin acid ratio of from about 75% to 100%, the yield of abietic acid increasing as the free resin acid ratio increases. As shown by Examples 1 and 3, a free resin acid ratio of 80% gives a yield of abietic acid sufficiently high to result in a satisfactory separation of abietic acid from non-abietic type resin acids.

Thus, the present invention provides a simple and economical process for obtaining crystalline abietic acid of high purity from resin acid mixtures originating from coniferous trees and a method for separation of abietic acid from non-abietic type resin acids. It further enables the obtaining of stable dispersions of non-crystallizing, non-abietic type resin acids in water and the ability to obtain therefrom non-crystallizing, non-abietic type resin acids substantially free of abietic acid and neutral matter.

I will now describe in detail the starting materials used and individual process steps, such as methods for obtaining the required FRA ratio and for creating dispersions, the effect of the concentration of the dispersed phase, of salt concentration, of temperature, and other factors entering into the present process.

*Starting materials.*—Starting materials for the present process may be gum rosin, wood rosin, isomerized rosin or tall oil resin acids, or, in general, resin acid mixtures of sizable abietic acid content and originating from various species of coniferous trees. Preferably the starting materials should contain a minimum of oxidized material, the presence of which is liable to slow down crystallization of the abietic acid fraction. If the object is to obtain abietic acid in the highest possible yield, starting materials of low abietic acid content may be given a previous isomerizing treatment.

Tall oil resin acid starting materials are available in a number of different forms. Tall oils as such, especially distilled or chemically refined or partially esterified tall oils are suitable starting materials. However, the yields of crystalline resin acids obtainable according to the present invention directly from tall oils are generally low because of the presence of a large proportion of fatty acids. The latter, whether in the free or neutralized or otherwise modified state, have a tendency to prevent crystallization of the abietic acid fraction. For this reason, I prefer as starting materials tall oil resin acid concentrates. These may originate from any of the known processes for separating tall oil into its main components, namely fatty and resin acids, even though such separation may be rather incomplete. While some of the separation processes produce resin acids which for all practical purposes are free of fatty acids, the resin acid fraction from other processes may still contain minor portions of the fatty acid fractions, either modified or free fatty acids, originally present in tall oil. I have found that such tall oil resin acids can be efficiently processed according to the present invention. Since the fatty acids are stronger acids than the resin acids, decomposition of the resin acid soaps precedes that of the fatty acid soaps. Consequently, the fatty acid soaps will remain undecomposed even though the resin acids may be completely decomposed by mineral acid. In this case the presence of fatty acid soaps is of great advantage since these soaps serve as dispersing agents for the resin acids. A few examples of tall oil resin acids especially useful as starting materials for the present process by way of illustration and not limitation are: (1) The resin acid fraction obtained in the distillation of tall oil or modified (for example, partially esterified) tall oil, by removing the major part of the fatty acid fraction first, the resin acid fraction either coming over as a higher boiling distillate or remaining as still residue; (2) resin acid fractions originating from one of the numerous selective solvent processes for separating tall oil; (3) the dilute resin acid soap solution obtained according to Patent No. 2,356,988 and originating from a partial separation of fatty acid esters form a modified tall oil in which the fatty acids are present as alkyl esters; (4) the impure crystalline resin acids which separate from crude or distilled or chemically refined or partially modified tall oils on standing and still contain a minor portion of the non-abietic type resin acids and of the fatty acids originally present; (5) resin acid fractions furnished by a group of tall oil separation processes based on modifying the fatty acids, neutralizing the resin acids and removing the fatty acid component from the neutralized resin acids, etc. A typical example of these process is that of Patent No. 2,348,970 to Gayer and Fawkes which is based on esterifying the fatty acids, neutralizing the resin acids to obtain water-soluble soaps and removing the fatty acid component by solvent extraction. These processes result in a resin acid soap solution which keep dissolved a portion of the extracting solvent. After removing the major portion of the solvent such resin acid soap solutions can be directly processed according to the present invention.

All the aforementioned starting materials contain diverse proportions of non-abietic type resin acids. However, the presence of non-abietic acids is not a necessary condition for obtaining crystalline abietic acid according to the general principle of the present invention. The quarter salt, devoid of non-abietic type acids and obtained either by conventional methods or in accordance with the process disclosed in my co-pending application, Serial No. 745,723, can be transformed into abietic acid by the process disclosed herein. That is, abietic acid will crystallize from dispersions which were made with the quarter salt as starting material and in which the free resin acid ratio is higher than 75%. Vice versa, the quarter salt can be prepared by the process of the aforementioned co-pending application by using abietic acid as starting material and restricting the free resin acid ratio to between about 10 and 75%. Considering the great simplicity and economy of the present process, as compared with methods involving the use of organic solvents, the purely preparative step of obtaining abietic acid from the quarter salt must be considered another object of the present invention.

Mixtures of two or more of any of the aforementioned starting materials can be used.

*FRA ratio and the preparation of dispersions.*—As shown before, the FRA ratio in dispersions underlying the present invention may range from approximately 75% to 100%. Establishing the FRA ratio at which crystallization is desired to take place may coincide, precede or follow the preparation of a dispersion. Thus, a resin acid soap contained in aqueous solution may be decomposed to yield the desired FRA ratio by reacting it with suitable quantities of an acid, such as sulphuric acid. If such decomposition is accompanied by moderate agitation, the liberated free resin acids will form a dispersion suitable for the present process. Starting materials available in the form of free resin acids, such as rosin, may suitably be only partially neutralized with a strong alkali solution and then dispersed in requisite quantities of water, either by simple agitation or by the use of dispersing machinery. The desired FRA ratio also can be obtained in several steps. For example, a dispersion may be made with a certain FRA ratio and this subsequently changed to either a higher or to a lower figure by additional decomposition of soap or by adding alkali, respectively.

Thus, while the maximum yield of abietic acid is obtained in the free resin acid range of from about 80% to 100%, I may prepare as a first step a dispersion in which the free resin acids ratio is lower than that ultimately desired, and in the subsequent step increase the free resin acids ratio to the range giving maximum yield. This sequence of steps is helpful in obtaining a good dispersion when using only moderate agitation.

Besides applying agitation or using dispersing machines (colloid mills, homogenizers), other aids for obtaining dispersions can be used. For example, a free resin acid starting material or partially neutralized resin acids of a high FRA ratio may be dissolved in a small quantity of a water-miscible solvent, such as alcohol, and the solution stirred into suitable quantities of water. Another method for obtaining dispersions yielding crystalline abietic acid consists of replacing the alkali metal base with ammonia or a volatile organic base and driving off most or all of the volatile base which leaves the free resin acids finely dispersed. All these methods can be varied according to one or the other of the several modifications known to dispersion technology. For example, I may disperse a mixture of free resin acids and resin acid soaps in water, disperse resin acids in a soap solution, or disperse resin acids in a suitable quantity of water containing sufficient alkali to produce the required quantity of soap.

A combination of dispersing methods also may be employed. For example, I may create a dispersion of a partially neutralized rosin by simple agitation and then run the dispersion through a dispersing or homogenizing machine to obtain a finer dispersion. Or I may partially neutralize the resin acids with a portion of alkali corresponding to the final FRA ratio and solubilize all or part of the balance of the resin acids with ammonia, then drive off the ammonia and thereby disperse the resin acids liberated by the removal of ammonia. A dispersion also may be diluted with water to decrease its solids content, or two dispersion of a different FRA ratio may be combined in such proportions that the resulting dispersions will be of the desired FRA ratio. From the foregoing, it must be evident that a large number of variations are possible in producing a certain FRA ratio or creating suitable dispersions and, therefore, the present invention is not limited to or dependent upon any particular method or sequence of steps in establishing a FRA ratio or creating a dispersion. In general, I prefer creating a crystallizing dispersion simultaneously with adjusting the FRA ratio by decomposing a neutral, or nearly neutral, or at least completely water-soluble resin acid soap with acid because with this method satisfactory dispersions can be made with a minimum of mechanical work and simple equipment.

It also will be recognized by those skilled in the art that while the results obtainable according to the present invention so far have been considered to be a function of the FRA ratio, they also may be expressed in terms of hydrogen ion concentration of the aqueous dispersing medium. Thus, I found that the pH accompanying FRA ratios from about 75% to 100% ranges from approximately 8.0–8.5 to about 4–5 and, at a constant FRA ratio, depends on the type of resin acids present, on the concentration of the dispersed phase and soap, the alkali metal base and decomposing acid used, salt concentration, temperature, etc. Under otherwise standard conditions, especially in large scale operation, the pH as a control factor can conveniently replace or supplement the use of the FRA ratio as a measure of the proportion of free resin acids to resin acid soaps.

The proportion of water to the resin acid starting material is of considerable importance in preparing the dispersions. This proportion, to be termed "water ratio," is defined as "parts by weight of water to one part of starting material," the latter including not only free and neutralized resin acids but also neutral bodies and impurities.

The dispersions underlying the present process are of the oil-in-water type. As is known, to obtain such dispersion of resin acids the water has to be present in considerable excess over the total resinous matter. For example, if, to facilitate dispersion, at first more than 25% of the acidity of the starting material is neutralized by heating under reflux with a strong, about 2 N alkali, a water-in-oil type dispersion results. A sudden reversal of phases will take place if now about 5 parts of hot water are added rapidly. In general, the formation of oil-in-water type dispersions of resin acids requires a minimum water ratio of from about 5 to 10, depending on the FRA ratio. On the other hand, a minimum water ratio of approximately 10 to 20 is necessary for good dispersion. The preparation of dispersions, especially at free resin acid ratios near 100%, becomes easier as the water ratio is increased. Water ratios as high as 200 or more can be used. However, at these excessive water ratios the yield of abietic acid is considerably less than at lower water ratios. My preferred limits are a water ratio of at least 20 and not more than 100. Variations within these limits are substantially without effect on the results.

Another factor influencing the preparation of dispersions is the presence of salt dissolved in the dispersing medium. Such salt may originate from the decomposition reaction between resin acid soap and mineral acid in adjusting the free resin acid ratio and preparing the dispersion, or may be introduced by the water used, or may be contained in the starting material, as, for example, a salted out resin acid soap fraction. There is a certain maximum salt concentration below which dispersions are easily made and crystallization proceeds smoothly resulting in well developed crystals. When the salt concentration exceeds the maximum limit, dispersion becomes difficult and a portion of the material to be dispersed may be precipitated in the resinous form. Maximum salt concentrations for sodium sulphate, for example, are of the order of 1.5 to 2.0% with respect to the water present. By using a sufficiently high water ratio in preparing or diluting the dispersions, the salt concentration can be conveniently reduced below the maximum concentration. If the salt is sodium sulphate or sodium chloride, I prefer to work at concentrations of about 1% or less. For example, in the foregoing Example 2 the decomposition of the sodium resinate with 8.0 cc. 2 N sulphuric acid caused the formation of 1.14 grams sodium sulphate which dissolved in 300 cc. water gives a salt concentration of approximately 0.4%.

*Temperature.*—Of considerable importance for a successful operation of the present process is the temperature at which the dispersions are prepared and at which crystallization is allowed to proceed. I have found that both process steps can be carried out at a temperature range of from approximately normal room temperature to the boiling point of water. However, I prefer to work within a temperature range of from approximately 35° C. to 100° C. because in this range dispersions are easier made and crystallization takes place more rapidly than near room temperature. Thus, I found that dispersions made at higher temperatures from gum or wood rosin, or in general, from rosins which have not been given an isomerizing treatment, if rapidly cooled to near room temperature, will not form any crystals at all or, at best, crystallize extremely slowly. Even at higher temperatures, such dispersions frequently require stimulation by seeding or agitation to bring about crystallization.

Variations as to temperature are possible inasmuch as preparing the dispersions and crystallizing them can be done at different temperatures.

*Processing chemicals.*—The alkaline agents most likely to be used in commercial operation for neutralizing resin acids are sodium carbonate or sodium hydroxide. Other alkaline sodium compounds can be used for neutralization. Potassium is fully equivalent with sodium. The use of ammonia for first solubilizing and then dispersing resin acids is especially economical since the ammonia driven off the ammonium soap solution can be recovered and reused again in processing a subsequent batch of starting material. Also, the decomposition of the ammonium soap, either partial or complete, can be effected by heating. Thus, no salt is introduced into the dispersing medium, and after removing the coagulated non-abietic acid portion from the filtrate by boiling or with a water-immiscible solvent, the water can be used again. Mixtures of several alkaline neutralizing substances can be used. For decomposition of resin acid soaps a number of acids, organic or organic, or acid salts like sodium bisulphate, can be used. For plant scale work, I prefer sulphuric acid suitably diluted. It is immaterial whether the acid is added to a suitably diluted soap solution or whether a soap solution is poured into water containing the requisite amount of acid.

*Dispersing agents.*—At FRA ratios below about 95% the resin acid soap present in the dispersion serves as dispersing agent or protective colloid, the presence of which makes for easy dispersion and aids in keeping the non-abietic acid portion well dispersed while, at the same time, not interfering with the crystallization of the abietic acid portion. At FRA ratios from 95 to 100%, the making of sufficiently stable crystallizing dispersions becomes increasingly difficult unless salt is either absent, or high and uneconomical water ratios are used. In this case, forming of dispersions can be much facilitated by the presence of added dispersing agents, such as fatty acid soaps, sulphonic acids, sulphonates, casein, etc. Added dispersing agents may also be useful at FRA ratios of about 75 to 95% for obtaining special effect such as keeping traces of colored impurities in the dispersed state, or slowing down the rate of crystallization in processing rapidly crystallizing dispersions, as, for example, in the processing of quarter salt for abietic acid. It must be emphasized, however, that the presence of added dispersing agents is, regardless what the FRA ratio, not at all necessary to obtain crystallizing dispersions according to the general principle of the present invention.

*Crystallization.*—I have found that the time required for complete crystallization varies widely with different starting materials, crystallization being the more rapid the higher the degree of isomerization of the starting material. Dispersions made from highly isomerized resin acid mixtures develop crystals spontaneously, starting within a few minutes after the dispersion is made. If such dispersions are made by stirring acid into a soap solution, it is important to add the decomposing acid at a rapid rate in order to reach the required FRA ratio before any quarter salt had a chance to form while passing through the lower FRA ratios. Once formed, the quarter salt is not decomposed even by an excess of acid.

The rate of crystallization is of an entirely different order in dispersions made from rosins of a low degree of isomerization such as gum rosin. Such dispersions crystallize very slowly. Crystallization can be stimulated by seeding, agitation, alternate cooling and heating. A homogenizing treatment also may initiate and accelerate crystallization. Normally, crystallization is complete in from one to several hours. The abietic acid crystallizes in the form of loose plates which sink to the bottom of the container.

A necessary condition for efficient filtration is that the crystals be well developed and of a sufficiently large size. The rate of crystallization and correspondingly the size of crystals are conveniently controlled by the water ratio, higher ratios, i. e. lower concentration of the dispersed abietic acid favoring slow crystallization and the formation of large crystals. While easily filtrable crystals may be so small as to appear crystalline only under magnification, under favorable conditions the abietic acid crystals reach linear dimensions of 1-2 mm.

The crystal forms assumed by the products obtained according to the present process are largely the same as, or similar to those obtained from organic solvent solutions. Thus, the abietic acid can assume a large variety of crystal forms depending on the degree of isomerization of the starting material, the water ratio, temperature, salt concentration, if any, or the nature of the cation of the soap. During this work, all the crystal types were encountered which in an illustrated publication by Georgi (J. Chem. Ed., 10, 416 (1933)) were ascribed to pure abietic acid and isomerized resin acids.

*Products.*—The crystalline products obtained according to the present invention are characterized by a purity much greater than that of the starting materials. As shown in the examples, the acid number of the abietic acid obtained ranges from about 180 to 184. The calculated acid number of abietic acid is 185.5. Since the acid number of most starting materials ranges from about 160 to 170, the high acid number of the separated abietic acid portion indicates that a large part of neutral bodies of the starting material remains dispersed with the non-abietic type acids. That the crystalline phase obtained according to the present invention consists of abietic acid, as defined herein, is easily proven by its transformation into the quarter salt, either in organic solvent solution or in aqueous dispersion, according to the procedure of my aforementioned co-pending application, Serial No. 745,723. The color of the abietic acid fraction also shows a great improvement over that of dark-colored starting material. To reduce its bulkiness and reduce surface oxidation, the crystalline abietic acid may be melted and rapidly cooled to form a compact glassy resin of the appearance of rosin but of a melting point approximately 10-20° C. higher than that of rosin. If kept at appropriate temperatures, such as between its melting point and approximately 140° C., the fused abietic acid will rapidly crystallize. The melting points of the crystalline abietic acid fractions in relationship to the starting material from which they were obtained increase in the order, wood rosin, isomerized rosin, tall oil resin acids, and range from about 140-146° C. for abietic acid from N wood rosin to about 155-161° C. for that from tall oil resin acids. A similar increase is shown in the melting points (R. & B.) of the fused abietic acid fractions and the specific rotations as shown by the examples, indicating an increasing isomerization toward l-abietic acid. It is apparent that if applied to highly isomerized starting materials as, for example, tall oil resin acids, the present process is a highly efficient refining process since the bulk of the starting material is recovered in a high state of purity, the minor portion, consisting of non-abietic acids, neutral bodies and coloring matter, remaining in dispersion.

The non-abietic acid portion remaining in the filtrates from the crystalline abietic acid portion can be utilized in several ways. One application of such dispersions may be to their direct use as paper size. After neutralizing the free resin acids, the filtrates also may be used for preparing metallic resinates. The solids content of the filtrates can also be recovered by decomposing the soap present and, if necessary, accelerating the coagulation of the free acid by heating or adding salt. Or the solids content of the filtrates may be salted out and the resulting resin acid or resin acid-resin acid soap mixture further processed. The separation of the free resin acids from the acidified aqueous phase is greatly aided by the use of hydrocarbon solvents. The resulting solutions can be subjected to well known refining processes to improve the color and decrease the neutral body content of the dissolved resin acids. Or such resin acid solutions can undergo chemical processing, such as chlorination, sulphonation, etc. Due to its high content of neutral matter which usually has the consistency of a soft solid or of a viscous liquid, the non-abietic acid portion as recovered from the filtrate is, as a rule, soft and tacky. By removing the neutral bodies, non-abietic type resin acids of a satisfactory acid number and melting point are obtained. Such removal of the neutral matter can be effected by neutralizing the resin acid content with an alkali metal base, such as sodium hydroxide, regulating the concentration of the soap solution to provide more than 30 grams of neutralized resin acids per 100 grams of soap solution, and extracting the neutral bodies with a solvent such as hydrocarbon solvent. Application of this process to the non-abietic acid fraction is, due to the high neutral body content of the latter, much more economical than extracting the neutral matter from the starting material.

In contrast to the abietic acid portion, the recovered non-abietic type acids are, even when freed of the major portion of neutral matter, non-crystallizing when kept for prolonged periods at temperatures ranging from their melting point to about 150° C. The resin acids obtained by removing the major portion of the neutral bodies from the non-abietic acid portion have higher melting points than the resin acid mixture from which they originate. Thus, the melting points of N wood rosin and isomerized N wood rosin, as used in Example 1, were 80 and 82° C. respectively. The non-abietic acid portions freed from neutral bodies of Example 3 had a melting point of 93° C. The combination of high melting point and lack of crystallizability are novel features heretofore not found in any of the so-called non-crystallizing rosins.

The following examples show some of the applications of the present process and some of the numerous variations in procedure for obtaining dispersions of a certain FRA ratio. In some of these examples, the non-abietic type resin acids have been recovered from the filtrates. In order to obtain these acids in a purer form and make a more useful comparison between the two types of acids, the neutral bodies which become concentrates in the non-abietic acid fraction were removed. The colors are given on the rosin color scale. The melting points (R. & B.) for abietic acid are those of the amorphous product, i. e. the fused and rapidly cooled acid. The iodine numbers were determined according to Wijs using exactly the same conditions of concentration, time, temperature and excess of iodine when comparing the two types of acids. Specific rotations were determined in a 2% methanol solution at room temperature.

*Example 4*

Ten grams F wood rosin, acid number 150, were neutralized to a FRA ratio of 35%, the mixture dispersed in 600 cc. hot water, the FRA ratio increased to 80% and the dispersion allowed to crystallize.

*Crystalline product.*—2.0 grams abietic acid, acid number 180.

*Example 5*

One hundred grams N wood rosin, acid number 163, were heated 30 minutes with 89.0 cc. 2.12 N sodium hydroxide, resulting in a FRA ratio of 35%. The hot mixture was stirred into 4 liters distilled water heated to 95° C. and the FRA ratio raised to 80% by stirring in 65.5 cc. 2 N sulphuric acid. The resulting dispersion was seeded with abietic acid crystals and allowed to stand at from 95° C. to 80° C. for several hours with intermittent shaking, and then filtered. The filtrate was acidified and from the recovered non-abietic acid fraction the neutral matter largely removed.

Yields and constants of the products are given in the following table:

|  | Yield, Per Cent | Acid Number | Color | M.P. (R & B) | Iodine Number | Specific Rotation |
|---|---|---|---|---|---|---|
|  |  |  |  | ° C. |  |  |
| Abietic Acid | 44.0 | 179 | N | 88 | 118 | −18.2 |
| Non-abietic Acids | 47.3 | 173 | F | 90 | 101 | +10.6 |

Example 6

Fifty grams "Commercial Abietic Acid" were neutralized to the extent of 65% of the resin acids with 2.31 N sodium hydroxide. The mixture was dispersed in 2 liters boiling distilled water and the FRA ratio raised to 80%. The dispersion was placed into a water bath at 85° C. overnight.

*Crystalline product.*—21.5 grams abietic acid, acid number 178.

Example 7

One hundred grams of isomerized N wood rosin of acid number 160 were heated one-half hour with 94.5 cc. 2.12 N sodium hydroxide resulting in a FRA ratio of 30%. The hot mixture was stirred into 3.8 liters boiling distilled water and when the temperature reached 95° C. the FRA ratio was increased to 80% by stirring in 71.5 cc. 2 N sulphuric acid. The dispersion was allowed to stand at a temperature of 75–80° C. for several hours. The crystals were filtered off, the filtrate acidified, the non-abietic acids recovered and treated for the removal of neutral bodies. Yields and constants are given in the following table:

|  | Yield, Per Cent | Acid Number | Color | M.P. (R & B) | Iodine Number | Specific Rotation |
|---|---|---|---|---|---|---|
|  |  |  |  | ° C. |  |  |
| Abietic Acid | 53.0 | 181 | N | 90 | 109 | −45.0 |
| Non-abietic Acids | 36.8 | 172 | F | 93 | 86 | −5.2 |

Example 8

Ten grams powdered isomerized N wood rosin were warmed with dilute ammonia to obtain a clear solution and the volume of the solution made up to 400 cc. Now the solution was boiled to drive off the ammonia, the volume being kept constant by adding water. When the pH of a cooled sample reached 6.9, the dispersion was kept at 80° C. for one hour and the crystals filtered.

*Crystalline product.*—6.2 grams abietic acid, acid number 180.

Example 9

Twenty per cent of the resin acids in 10 grams "Commercial Abietic Acid" were neutralized with sodium hydroxide, an additional 50% of the resin acids was neutralized with ammonia. The solution was diluted with distilled water at 400 cc. and boiled until the odor of ammonia could no longer be observed. Crystals began to form during boiling.

*Crystalline product.*—5.0 grams abietic acid, acid number 180.

Example 10

Ten per cent of the resin acids in 10 grams isomerized N wood rosin were neutralized with 2.12 N sodium hydroxide and the mixture dissolved in 10 cc. alcohol. The solution was stirred into 400 cc. water kept at 95° C. in small portions and at a rate to permit the alcohol to boil off before the next portion was added. The dispersion was allowed to crystallize at 80° C. for 2 hours.

*Crystalline product.*—5.6 grams abietic acid.

Example 11

Ten grams "Commercial Abietic Acid" was neutralized with 2.04 N. potassium hydroxide and the soap diluted with water to 400 cc. The solution was now heated to 90° C. and the soap decomposed with 2 N sulphuric acid to a FRA ratio of 90%. After 2 hours at 75–80° C., the dispersion was filtered.

*Crystalline product.*—5.3 grams abietic acid, acid number 178.

Example 12

(A) Ten grams tall oil resin acids, acid number 175, obtained by the complete decomposition of the raffinate according to Patent No. 2,348,970, were reacted with 2.31 N sodium hydroxide to a FRA ratio of 35%. The reaction product was stirred into 400 cc. boiling distilled water and decomposed while stirring with 2 N hydrochloric acid to a FRA ratio of 90%. The dispersion was allowed to crystallize 3 hours at 75° C. and after cooling filtered.

*Crystalline product.*—5.3 grams abietic acid, acid number 180.

(B) This experiment was repeated using acetic acid for decomposing the soap under otherwise the same conditions.

*Crystalline product.*—5.2 grams abietic acid, acid number 179.

Example 13

To 100 grams resin acid soap raffinate from the tall oil separation process according to Patent No. 2,348,970, containing 44% water and 28.5% by weight of solvent, 40 cc. water and one drop of of a foam depressant organic silicon compound were added and the solvent distilled. The water distilling with the solvent was continuously returned to the still. The still residue was run into 900 cc. boiling water and the soap partially decomposed with 34.0 cc. 1.93 N sulphuric acid. The resulting dispersion was kept at 75–80° C. for 2 hours and after cooling filtered.

*Crystalline product.*—14.7 grams abietic acid, acid number 180.

Example 14

Samples of neutral soap solutions of isomerized N wood rosin and of tall oil resin acids, which were diluted with distilled water to varying water ratios, were heated to 60° C. and in each sample the soap partially decomposed with dilute sulphuric acid, the FRA ratio increasing by intervals from 75% to 100%. The resulting dispersions were allowed to crystallize at 60° C. Water ratios, yields and acid numbers of the crystalline products, calculated salt concentrations, and pH values for the tall oil resin acid dispersions are given in the following table. It was observed that at the FRA ratio of 75% the crystals were needle-shaped, whereas at 80% the characteristic plates of abietic acid were obtained.

| FRA, percent | Water ratio | Isomerized N Wood Rosin, Acid No. 165 | | | Tall Oil Resin Acids, Acid No. 170 | | | pH | |
|---|---|---|---|---|---|---|---|---|---|
| | | Yield, percent | Acid No. | Na₂SO₄ conc., percent | Yield, percent | Acid No. | Na₂SO₄ conc., percent | before crystallization | of filtrate |
| 75 | 25 | 59 | ¹131 | 0.62 | 62 | ¹139 | 0.65 | 8.0 | 8.5 |
| 80 | 25 | 60 | 180 | 0.66 | 63 | 180 | 0.69 | 7.7 | 8.2 |
| 90 | 25 | 61 | 180 | 0.75 | 64 | 182 | 0.78 | 6.9 | 7.3 |
| 95 | 50 | 61 | 181 | 0.40 | 65 | 180 | 0.41 | | |
| 100 | 100 | 53 | 181 | 0.21 | 61 | 181 | 0.22 | 4.9 | |

¹ Quarter salt.

*Example 15*

In 1500 grams resin acid soap raffinate from the tall oil separation process according to Patent No. 2,348,970 and in which the resin acid content was known by previous analysis, the soap was decomposed to a FRA ratio of 35% and the solvent removed. The partially decomposed soap solution was stirred into 8 liters water of 80° C. and stirring was continued while the FRA ratio was increased to 95% by the rapid addition of sulphuric acid. Crystallization was allowed to proceed while the dispersion was gently agitated and slowly cooled to room temperature. The crystals were separated by filtration and the non-abietic acid portion recovered from the filtrate. The non-abietic acid fraction was found to contain 7% fatty acids. It was given an esterifying treatment which transformed the fatty acids into their methyl esters. The resin acids now were neutralized with 4 N sodium hydroxide and the resulting soap diluted with water to adjust the resin acid concentration of the soap solution to 36%. The fatty acid esters and other neutral matter were now extracted from the soap solution with benzol and from the extracted soap solution the purified non-abietic type resin acids recovered. Yields and constants of the two acid fractions are given in the following table:

| | Yield, Percent | Acid No. | Color | M. P. (R & B) | Iodine No. | Specific Rotation |
|---|---|---|---|---|---|---|
| | | | | °C. | | Degrees |
| Abietic Acid | 62.1 | 182 | I | 99 | 127 | −58.3 |
| Non-abietic Acids | 23.4 | 164 | F | 84 | 100 | −5.3 |

*Example 16*

In 200 grams tall oil resin acid soap raffinate, containing 50.6 grams resin acids as soap, 35% of the soap was decomposed and the solvent removed by distillation. The resulting sodium acid resinate was stirred into 1727 cc. hot water to which 58.7 cc. N sodium hydroxide were added in order to neutralize the free resin acids in the sodium acid resinate. To the now neutral soap solution dilute sulphuric acid was added to decompose 95% of the soap present. The dispersion was allowed to stand until the crystallization of the abietic acid was complete.

*Crystalline product.*—32 grams abietic acid, acid number 184, color WG.

In comparison, the resin acids obtained by complete decomposition of the resin acid soap raffinate had an acid number of 171 and were of a dark red color.

*Example 17*

Twenty grams crude resin acid crystals separated by centrifuging crystallized crude tall oil and containing 20% fatty acids were heated with 2.31 N sodium hydroxide to neutralize all the fatty and resin acids present. The soap solution was diluted with 600 cc. hot water and dilute sulphuric acid added in an amount equivalent to 75% of the alkali used for neutralization. The dispersion crystallized rapidly.

*Crystalline product.*—11.2 grams abietic acid, acid number 180.

*Example 18*

A crude tall oil was rapidly distilled at a pressure of 13 mm. until the distillate was 55% by weight of the charge. The still residue had an acid number of 129 and the composition 50.6% resin acids, 22.1% fatty acids and 27.3% unsaponifiable.

Ten grams of the still residue were completely neutralized with sodium hydroxide, the soap stirred into 300 cc. boiling water and sulphuric acid added in a quantity equivalent to the resin acid soap present. The resulting dispersion was allowed to crystallize over a period of two days.

*Crystalline product.*—2.9 grams abietic acid, acid number 177, representing 57% of the resin acids present in the starting material.

*Example 19*

(A) A mixture of 10 grams isomerized N wood rosin and 1 gram cotton seed oil fatty acids was completely neutralized and the soap diluted to a water ratio of 50. The resin acid soap was now decomposed with sulphuric acid and the resulting dispersion allowed to stand.

*Crystalline product.*—6.4 grams abietic acid, acid number 181.

(B) One gram cotton seed oil fatty acids was neutralized with sodium hydroxide and the soap diluted to 250 cc. with distilled water. Ten grams isomerized N wood rosin were now suspended in the soap solution at about 50° C. and ammonia added until the rosin was dissolved. The solution was now boiled until the odor of ammonia disappeared, the water boiling off being replaced. The abietic acid crystallized rapidly.

*Crystalline product.*—6.3 grams abietic acid, acid number 181.

*Example 20*

One hundred cubic centimeters of a resin acid soap solution obtained by the tall oil separation process according to Patent No. 2,356,988 and containing 8.3 grams resin acids and 2.3 grams fatty acid esters plus unsaponifiable, were diluted with 232 cc. water. The solution was heated to 80° C. and 80% of the soap decomposed with sulphuric acid. The dispersion was allowed to stand at 80° C. for several hours and then filtered.

*Crystalline product.*—2.9 grams abietic acid, acid number 178.

*Example 21*

(A) Five grams abietic acid quarter salt, formed and separated in accordance with my aforementioned co-pending application, were completely neutralized with sodium hydroxide and the soap solution diluted to 250 cc. with hot water. Now under lively agitation 6.5 cc. 2 N sulphuric acid were rapidly added to create a FRA ratio of 80%. In the resulting dispersion crystals were formed in a short time.

*Crystalline product.*—3.3 grams abietic acid, acid number 181.

(B) A mixture of 10 grams abietic acid quarter salt and 1 gram oleic acid was completely neutralized with sodium hydroxide and the soap diluted to 300 cc. with boiling water. To the hot solution, 15.4 cc. 2 N sulphuric acid were added to cause decomposition of 95% of the sodium abietate. The dispersion was allowed to crystallize for two hours.

*Crystalline product.*—8.0 grams abietic acid, acid number 180.

(C) A mixture of 10 grams abietic acid quarter salt and 10 grams isomerized N wood rosin was reacted with sufficient 2 N sodium hydroxide to reduce the FRA ratio of the mixture to 20% and the hot mixture stirred into 1 liter boiling water. The FRA ratio was now increased to 90% by the rapid addition of 2 N sulphuric acid. Abietic acid crystallized while the mixture slowly cooled to room temperature.

*Crystalline product.*—14 grams abietic acid, acid number 181.

I claim as my invention:

1. The method of recovering abietic acid from mixed resin acid material of the group consisting of rosin, isomerized rosin, tall oil resin acids, and their mixtures, and alkali metal soaps of said materials, which comprises preparing an aqueous dispersion containing said resin acid material at a free resin acids ratio in the range of from 75% to 100% in from 10 to 200 parts by weight of water, and crystallizing abietic acid therefrom by permitting the dispersion to stand at a temperature of from about normal room temperature to about 100° C.

2. The method of separating mixed resin acid material of the group consisting of rosin, isomerized rosin, tall oil resin acids and their mixtures and alkali metal soaps of said materials into crystalline abietic acid material and non-crystallizing non-abietic acid material fractions, which comprises preparing an aqueous dispersion containing said mixed resin acid material in a condition of from 0% to 25% alkali neutralization, in from 10 to 200 parts by weight of water, crystallizing abietic acid material therefrom by permitting the dispersion to stand at a temperature of from about normal room temperature to about 100° C., and separating the resulting crystalline material from the aqueous medium, the latter containing the non-abietic type resin acids.

3. The process of claim 2 wherein the non-abietic type resin acids are separated from neutral matter contained in said aqueous medium and recovered as a separate product of the process.

4. The process of claim 3 wherein separation is effected by neutralizing the resin acid content with an aqueous solution of an alkali metal base while regulating the concentration of the resulting soap solution to provide more than 30 grams of neutralized resin acids per 100 grams of soap solution, and extracting the neutral bodies therefrom with a hydrocarbon solvent.

5. The method of separating mixed resin acid material of the group consisting of rosin, isomerized rosin, tall oil resin acids and their mixtures and alkali metal soaps of said materials into crystalline abietic acid material and non-crystallizing non-abietic acid material fractions, which comprises preparing an aqueous dispersion containing said mixed resin acid material regulated to a free resin acids ratio in excess of 75% and in from 10 to 200 parts by weight of water to provide a pH of from about 8.0–8.5 to about 4–5, crystallizing abietic acid therefrom by permitting the dispersion to stand at a temperature of from about 35° C. to about 100° C., and separating the resulting crystalline material from the aqueous phase.

6. The method of separating abietic acid from mixed resin acid material of the group consisting of rosin, isomerized rosin, tall oil resin acids and their mixtures, which comprises preparing an aqueous dispersion containing said resin acid material in a condition of substantially 100% free resin acid content and in from 20 to 200 parts by weight of water, and crystallizing abietic acid therefrom by permittng the dispersion to stand at a temperature of from about 35° C. to about 100° C.

7. The method of separating abietic acid from mixed resin acid material of the group consisting of alkali neutralized rosin, isomerized rosin, tall oil resin acids and their mixtures, which comprises preparing an aqueous dispersion containing said material regulated to a free resin acids ratio in excess of 75% and in from 10 to 200 parts by weight of water to form an oil-in-water type dispersion and to reduce concentration of formed salt below about 2%, and crystallizing abietic acid therefrom by permitting the dispersion to stand at a temperature of from about 35° C. to about 100° C.

8. The method of separating abietic acid from mixed resin acid material of the group consisting of rosin, isomerized rosin, tall oil resin acids and their mixtures, which comprises preparing an aqueous dispersion of said material while partially neutralized and having a free resin acids ratio of from 75% to 95%, in from 20 to 100 parts by weight of water, and crystallizing the abietic acid therefrom by permitting the dispersion to stand at a temperature of from about 35° C. to about 100° C.

9. The process of recovering abietic acid from mixed resin acid material of the group consisting of rosin, isomerized rosin, tall oil resin acids, and their mixtures, which comprises neutralizing said material with an aqueous alkaline agent, agitating and diluting the soap solution with added water to form a water to solids ratio of approximately 20–200 to 1, decomposing the soap with an acidic material until from about 75% to 100% of the resin acids are in the free state, and crystallizing the abietic acid therefrom by permitting the dispersion to stand at a temperature of from about 35° C. to about 100° C.

10. The process of recovering abietic acid from mixed resin acid material of the group consisting of rosin, isomerized rosin, tall oil resin acids, and their mixtures, which comprises neutralizing said material with an aqueous alkali, agitating and diluting the soap solution with added water to form a water to solids ratio of approximately 20–200 to 1 and to reduce concentration of salt subsequently formed in the process below about 1%, decomposing the soap with acidic material until from about 75% to 100% of the resin acids are in the free state, and crystallizing the abietic acid therefrom by permitting the dispersion to stand at a temperature of from about 35° C. to about 100° C.

11. The process of claim 10 wherein the alkali is an alkali metal hydroxide.

12. The process of claim 10 wherein the alkali is an alkali metal carbonate.

13. The process of claim 10 wherein the acidic material is sulfuric acid.

14. The process of claim 10 wherein the resin acid material is wood rosin.

15. The process of claim 10 wherein the resin acid material is isomerized rosin.

16. The process of claim 10 wherein the resin acid material is tall oil resin acid.

17. The process of separating abietic acid contained in mixed resin acid material of the group consisting of rosin, isomerized rosin, tall oil resin acids and their mixtures, which comprises neutralizing in excess of 25% of the free resin acid content of said material with a strong aqueous alkali to form a water-in-oil type dispersion, stirring said dispersion into added water to form an oil-in-water type dispersion to provide a water to solids ratio of approximately 20–200 to 1, decomposing said soap with an acidic material until from 75% to about 100% of the resin acids are in the free state, and thereafter permitting the latter dispersion to stand at a temperature of from about 35° C. to about 100° C. to crystallize abietic acid therefrom.

18. The process of separating abietic acid contained in mixed resin acid material of the group consisting of rosin, isomerized rosin, tall oil resin acids and their mixtures, which comprises partially neutralizing the free resin acid content of said material with a strong aqueous solution of an alkali metal base to neutralize in excess of 25% of said free resin acid content, dispersing said mixture in water to provide a water to solids ratio of approximately 20–200 to 1 and to reduce concentration of alkali metal salt subsequently formed in the process below about 1%, decomposing said soap with an acidic material until from 75% to about 100% of the resin acids are in the free state, and permitting the resulting dispersion to stand at a temperature of from about 35° C. to about 100° C. to crystallize abietic acid therefrom.

19. The process of separating abietic acid from aqueous solutions of the alkali metal soaps of mixed resin acid material of the group consisting of rosin, isomerized rosin, tall oil resin acids and their mixtures, which comprises agitating and diluting the soap solution with water to form a water to solids ratio of approximately 20–200 to 1, decomposing the soap with an acidic material until from 75% to 100% of the resin acids are in the free state and permitting the resulting dispersion to stand at a temperature of from about 35° C. to about 100° C. to crystallize the abietic acid therefrom.

20. The process of separating mixed resin acid materials of the group consisting of rosin, isomerized rosin, tall oil resin acids and their mixtures into abietic acid and non-abietic portions, which comprises neutralizing in excess of 25% of the free resin acid content of said material with an alkali and dispersing it in from 10 to 200 parts by weight of water, decomposing the soap with an acidic material until from 75% to about 95% of the resin acids are in the free state, thereafter permitting the dispersion to stand at a temperature of from 35° C. to about 100° C. until abietic acid material crystallizes therefrom, and separating the crystalline material from the aqueous medium, the latter containing a mixture of non-abietic type resin acids and neutral matter.

21. The process of separating and recovering crystalline abietic acid from mixed resin acid material of the group consisting of rosin, isomerized rosin, tall oil resin acids and their mixtures, which comprises neutralizing from about 0% to 25% of said material with an alkali, neutralizing the balance thereof with a volatile base, the resulting solution containing from about 10 to about 200 parts by weight of water to 1 part of starting material, heating the solution to volatilize said volatile base to form an aqueous dispersion, and crystallizing abietic acid therefrom by permitting the dispersion to stand at a temperature of from about 35° C. to about 100° C.

22. The process of separating and recovering crystalline abietic acid from mixed resin acid material of the group consisting of rosin, isomerized rosin, tall oil resin acids and their mixtures, which comprises neutralizing said material with ammonia in the presence of water, the resulting solution containing from about 10 to about 200 parts by weight of water to 1 part of starting material, heating the solution to volatilize the ammonia to form an aqueous dispersion of a pH of less than 8, and crystallizing abietic acid therefrom by permitting the dispersion to stand at a temperature of from about 35° C. to about 100° C.

23. The process of recovering abietic acid from the quarter salt thereof, which comprises neutralizing said material to a free acid ratio of at most 20%, dispersing said mixture in water to provide a water to solids ratio of approximately 20–200 to 1, decomposing said soap with an acidic material until from 80% to about 100% of the resin acids are in the free state, and permitting the resulting dispersion to stand at a temperature of from about 35° C. to about 100° C. to crystallize abietic acid therefrom.

FREDERICK H. GAYER.

REFERENCES CITED

The following references are of record in the file of this patent:

UNITED STATES PATENTS

| Number | Name | Date |
| --- | --- | --- |
| 2,356,988 | Gayer | Aug. 29, 1944 |
| 2,406,097 | Morton | Aug. 20, 1946 |
| 2,409,930 | Cox | Oct. 22, 1946 |

OTHER REFERENCES

Palkin et al.: J. A. C. S., vol. 55, pp. 3679–3680, 1933.